United States Patent
Eversole et al.

(10) Patent No.: US 7,520,814 B2
(45) Date of Patent: Apr. 21, 2009

(54) BEARING CUP RETAINER FOR A UNIVERSAL JOINT

(75) Inventors: Philip A. Eversole, Toledo, OH (US); Blake T. Garretson, Liberty Center, OH (US); Krisstina K. Kohart, Angola, IN (US); Bao T. Luong, Lambertville, MI (US)

(73) Assignee: Dana Automotive Systems Group LLC, Toledo, OH (US)

( * ) Notice: Subject to any disclaimer, the term of this patent is extended or adjusted under 35 U.S.C. 154(b) by 305 days.

(21) Appl. No.: 11/215,819

(22) Filed: Aug. 30, 2005

(65) Prior Publication Data
US 2007/0049381 A1 Mar. 1, 2007

(51) Int. Cl.
*F16D 3/00* (2006.01)

(52) U.S. Cl. ..................... 464/131; 464/133

(58) Field of Classification Search .......... 403/57, 403/134; 464/131, 133, 130; 277/634, 635
See application file for complete search history.

(56) References Cited
U.S. PATENT DOCUMENTS

| | | | | |
|---|---|---|---|---|
| 4,129,016 A | * | 12/1978 | Olson, Sr. | 464/131 |
| 4,138,863 A | * | 2/1979 | Olson, Sr. | 464/130 |
| 4,515,574 A | * | 5/1985 | Mazziotti | 464/131 |
| 5,288,272 A | | 2/1994 | Marriott et al. | |
| 5,588,915 A | | 12/1996 | Smith | |
| 5,716,277 A | | 2/1998 | Reynolds | |
| 6,077,166 A | | 6/2000 | Reynolds | |
| 6,095,925 A | | 8/2000 | Smith | |
| 2006/0258467 A1 | * | 11/2006 | Kurzeja | 464/131 |

* cited by examiner

*Primary Examiner*—Aaron M Dunwoody
(74) *Attorney, Agent, or Firm*—Marshall & Melhorn, LLC

(57) ABSTRACT

A cross for a universal joint includes a body portion having a trunnion that extends outwardly therefrom. The trunnion includes a surface. A bearing cup is mounted on the trunnion. A retainer includes a first portion that is supported on the bearing cup, a second portion that extends at an angle from the first portion, and a third portion that extends at an angle from the second portion into engagement with the surface of said trunnion. The retainer allows the assembly of the bearing cup and the retainer to be installed on the trunnion with a relatively small force, but requires a relatively large force to remove the assembly of the bearing cup and the retainer from the trunnion.

15 Claims, 4 Drawing Sheets

BEARING CUP RETAINER FOR A UNIVERSAL JOINT

BACKGROUND OF THE INVENTION

This invention relates in general to a universal joint including a cross having a plurality of bearing cups supported on respective trunnions. In particular, this invention relates to an improved structure positively retaining the bearing cups on the trunnions prior to assembly in a drive train system.

Drive train systems are widely used for generating power from a source and for transferring such power from the source to a driven mechanism. Frequently, the source generates rotational power, and such rotational power is transferred from the source to a rotatably driven mechanism. For example, in most land vehicles in use today, an engine/transmission assembly generates rotational power, and such rotational power is transferred from an output shaft of the engine/transmission assembly through a driveshaft assembly to an input shaft of an axle assembly so as to rotatably drive the wheels of the vehicle. To accomplish this, a typical driveshaft assembly includes a hollow cylindrical driveshaft tube having a pair of end fittings, such as a pair of tube yokes, secured to the front and rear ends thereof. The front end fitting forms a portion of a front universal joint that connects the output shaft of the engine/transmission assembly to the front end of the driveshaft tube. Similarly, the rear end fitting forms a portion of a rear universal joint that connects the rear end of the driveshaft tube to the input shaft of the axle assembly. The front and rear universal joints provide a rotational driving connection from the output shaft of the engine/transmission assembly through the driveshaft tube to the input shaft of the axle assembly, while accommodating a limited amount of angular misalignment between the rotational axes of these three shafts.

A typical universal joint includes a cross having a central body portion with four cylindrical trunnions extending outwardly therefrom. The trunnions are oriented in a single plane and extend at right angles relative to one another. A hollow cylindrical bearing cup is mounted on the end of each of the trunnions. Needle bearings or other friction-reducing structures are provided between the outer cylindrical surfaces of the trunnions and the inner cylindrical surfaces of the bearing cups to facilitate rotational movement of the bearing cups relative to the trunnions during operation of the universal joint. In the front universal joint of the above-described driveshaft assembly, the bearing cups supported on the first opposed pair of the trunnions on a front cross are connected to the front end fitting of the driveshaft assembly, while the bearing cups supported on the second opposed pair of the trunnions on the front cross are connected to an end fitting secured to the output shaft of the engine/transmission assembly. Similarly, in the rear universal joint of the above-described driveshaft assembly, the bearing cups supported on the first opposed pair of the trunnions on a rear cross are connected to the rear end fitting of the driveshaft assembly, while the bearing cups supported on the second opposed pair of the trunnions on the rear cross are connected to an end fitting secured to the input shaft of the axle assembly.

Frequently, the first and second universal joints are manufactured concurrently with the driveshaft tube at a first location, then shipped as a unit to a second location for assembly with the other components of the vehicle drive train system. In such a manufacturing process, the front and rear end fittings are initially secured to the ends of the driveshaft tube, then a universal joint is connected to each of the end fittings. Thus, for each of the universal joints, only one opposed pair of the bearing cups is connected to an end fitting and, therefore, positively retained on the respective trunnions. The other opposed pair of the bearing cups remains mounted on the respective trunnions, but is not positively retained thereon. Following installation on the end fittings, each of the universal joints is purged with lubricant. Such purging is well known in the art and involves the injection of lubricant within the cross at a relatively high pressure. The lubricant passes through bores formed through each of the trunnions so as to move into the regions of the bearings disposed between the bearing cups and the trunnions.

It is known to provide elastomeric seals about the open ends of the bearing cups to retain lubricant in the region between the outer surface of the trunnion and the inner surface of the bearing cup where the roller bearings are located. The elastomeric seals also function to prevent the entry of dirt and other contaminants into the regions where the roller bearings are located. Additionally, it is known to provide rigid dust guards about the open ends of the bearing cups to protectively cover the elastomeric seals, and further to prevent the entry of dirt and other contaminants into the regions where the roller bearings are located. In some instances, the elastomeric seal and rigid dust guard have been combined into a single seal and dust guard assembly.

In the past, the rigid dust guards have been utilized to retain the bearing cups on the trunnions during shipment from the manufacturing facility to the assembly facility, as described above. To accomplish this, it is known to form the dust guard having a first portion that frictionally engages the outer surface of the trunnion and a second portion that engages an annular groove formed in the outer surface of the bearing cup. Although this structure has been generally effective, it has been found that the bearing cups can still become dislodged during shipment if a large impact is applied thereto. Even if the bearing cups are not removed from the trunnions as a result of these impacts, they may become misaligned therewith. Such misalignment is undesirable. Thus, it would be desirable to provide an improved structure for positively retaining the bearing cups on the trunnions of a universal joint cross prior to assembly.

SUMMARY OF THE INVENTION

This invention relates to an improved structure for positively retaining the bearing cups on the trunnions of a universal joint cross prior to assembly. The cross includes a body portion having a trunnion that extends outwardly therefrom. The trunnion includes a surface. A bearing cup is mounted on the trunnion. A retainer includes a first portion that is supported on the bearing cup, a second portion that extends at an angle from the first portion, and a third portion that extends at an angle from the second portion into engagement with the surface of said trunnion. The retainer allows the assembly of the bearing cup and the retainer to be installed on the trunnion with a relatively small force, but requires a relatively large force to remove the assembly of the bearing cup and the retainer from the trunnion.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
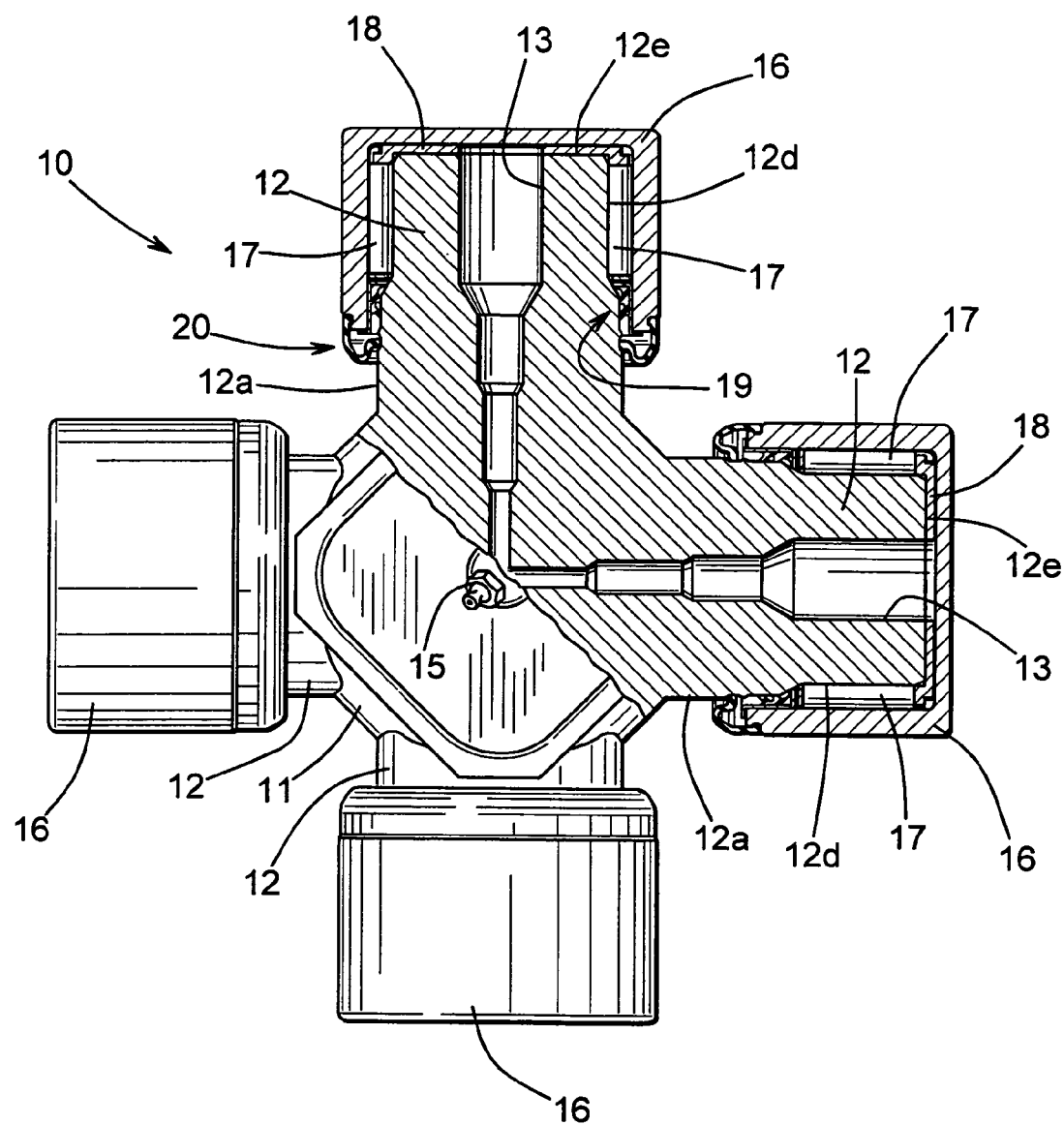
FIG. 1 is an elevational view, partially in cross section, of a cross for a universal joint including a first embodiment of a retainer for positively retaining a bearing cup on a trunnion in accordance with this invention.

Referring now to the drawings, there is illustrated in FIG. 1 a cross, indicated generally at 10, in accordance with this invention. The cross 10 is adapted to form a portion of a universal joint (not shown), such as described above in connection with a conventional drive train system. The illustrated cross 10 includes a central body portion 11 having a plurality of trunnions, indicated generally at 12, extending outwardly from the body portion 11. In the illustrated embodiment, four of such trunnions 12 are formed integrally with the body portion 11. The illustrated trunnions 12 are disposed at right angles relative to one another and are oriented so as to lie in a single plane, although such is not required. The illustrated trunnions 12 are generally hollow and cylindrical in shape and define respective axes through the trunnions 12, although again such is not required.

Figure 2:
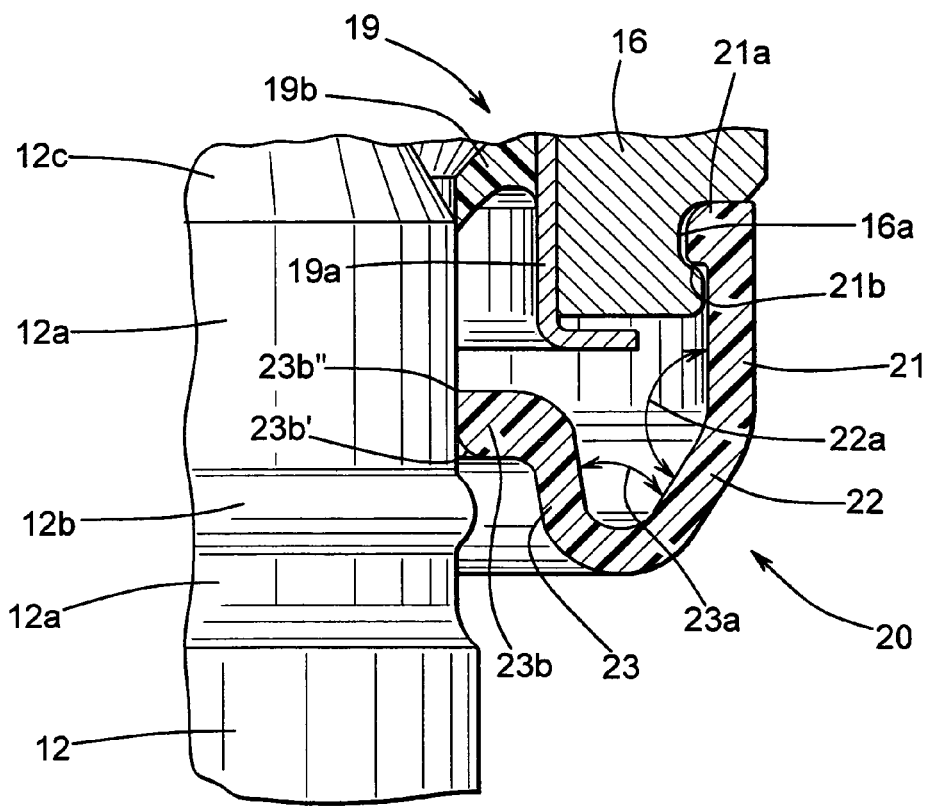
FIG. 2 is an enlarged elevational view, partially in cross section, of portions of one of the bearing cups and the retainers illustrated in FIG. 1 shown in an initial stage of installation on one of the trunnions.

The structure of one of the trunnions 12 is illustrated in detail in FIG. 2. As shown therein, the illustrated trunnion 12 includes a cylindrical friction surface 12a that extends axially outwardly from the body portion 11 of the cross 10. An annular ridge 12b is provided in the friction surface 12a. In the illustrated embodiment, the annular ridge 12b includes an axially inwardly facing surface that curves radially outwardly from the cylindrical friction surface 12a and an axially outwardly facing surface that curves radially inwardly back toward the cylindrical friction surface 12a. The axially inwardly facing surface and the axially outwardly facing surface of the ridge 12 may have any desired shape or shapes, but preferably are symmetrical in shape relative to one another. The trunnion 12 also includes a tapered surface 12c that extends axially outwardly from the cylindrical friction surface 12a. The tapered surface 12c decreases in diameter as it extends axially outwardly from the cylindrical friction surface 12a. The trunnion 12 further includes a cylindrical bearing surface 12d (see FIG. 1) that extends axially outwardly from the tapered surface 12c. The cylindrical bearing surface 12d defines a diameter that is somewhat smaller than the diameter defined by the cylindrical friction surface 12a. At the axially outermost end of the cylindrical bearing surface 12d, the trunnion 12 terminates at an end surface 12e. Preferably, each of the other trunnions 12 of the cross 10 have the same shape. However, it will be appreciated that some or all of the trunnions 12 may have any other desired shape or shapes.

Referring back to FIG. 1, an internal lubricant passageway 13 extends from a central internal cavity formed in the body portion 11 radially outwardly through each of the trunnions 12 to the axially outermost end surfaces 12e thereof. A lubricant fitting 15 is mounted on the body portion 11 of the cross 10 and communicates with the central internal cavity and, therefore, with each of the lubricant passageways 13. The lubricant fitting 15 is conventional in the art and is adapted to cooperate with a conventional lubricating mechanism (not shown) to inject lubricant into each of the lubricant passageways 13. Typically, the lubricant fitting 15 includes an internal check valve (not shown) that permits the one-way flow of lubricant into the central internal cavity formed in the body portion 11 of the cross 10, but prevents lubricant within the body portion 11 from leaking out in the reverse direction.

A bearing cup 16 is mounted on the end of each of the trunnions 12 of the cross 10. Each of the bearing cups 16 is generally hollow and cylindrical in shape, including a closed end, an open end, and a smooth inner cylindrical bearing surface. When mounted on the end of the associated trunnion 12, the closed end of the bearing cup 16 is disposed adjacent to the axially outer end surface 12e thereof, while the inner bearing surface of the bearing cup 16 is disposed concentrically about the cylindrical bearing surface 12d of the trunnion 12. The diameter defined by the inner bearing surface of the bearing cup 16 is somewhat larger than the diameter defined by the cylindrical bearing surface 12d of the trunnion 12, thus defining an annular space therebetween. A groove 16a (see FIGS. 2 through 5) is provided in the outer surface of the bearing cup 16 adjacent to the open end thereof. The purpose for this groove 16a will be explained below.

A plurality of conventional roller bearings 17 (only two are illustrated on each of the trunnions 12 in FIG. 1) is disposed in the annular space in a circumferential array about each of the trunnions 12. The roller bearings 17 have axially outer ends located adjacent to the closed end of the bearing cup 16 and axially inner ends located adjacent to the open end of the bearing cup 16. As is well known, the roller bearings 17 are provided to facilitate rotational movement of the bearing cup 16 relative to the trunnion 12.

If desired, a thrust washer 18 may be provided between the axially outer end surface 12e of the trunnion 12 and the inner surface of the closed end of the bearing cup 16. The thrust washer 18 is conventional in the art and is provided to reduce the amount of friction between the trunnion 12 and the associated bearing cup 16 when relative rotation occurs. The thrust washer 18 also reduces the amount of friction between the roller bearings 17 and the associated bearing cup 16. Moreover, the thrust washer 18 enables the bearing cup 16 to fit tightly on the trunnion 12 to prevent the cross 10 and trunnion 12 from endwise movement relative to the bearing cup 16 during operation, thereby reducing the amount of undesirable noise and vibration.

An annular seal assembly, indicated generally at 19, is provided about the open end of each of the bearing cups 16. The seal annular 19 is conventional in the art and includes a rigid support ring 19a and an elastomeric seal 19b. The illustrated support ring 19a is generally S-shaped in cross section, including a radially inwardly extending flange portion, an axially extending body portion, and a radially outwardly extending flange portion, although such is not required. The axially extending body portion of the support ring 19a defines an outer diameter that is slightly larger than an inner diameter defined by the inner bearing surface of the bearing cup 16. Thus, the support ring 19a can be pressed into the inner bearing surface and retained within the bearing cup 16 by friction. The elastomeric seal 19b is attached to the support ring 19a by any conventional means, such as by adhesive bonding. The illustrated elastomeric seal 19b includes one or more sealing lips that extend radially inwardly into engagement with portions of the trunnion 12. The annular seal assembly 19 is provided to prevent lubricant from flowing radially inwardly away from the region of the needle bearings 17, and further to prevent dirt, water, and other contaminants from entering into such region.

A first embodiment of a bearing cup retainer, indicated generally at 20, is connected to the bearing cup 16 and extends into engagement with a portion of the trunnion 12 so as to retain the bearing cup 16 thereon, such as during shipment from a manufacturing facility to an assembly facility, as described above. The illustrated retainer 20 is generally annular in shape and includes a first portion 21 that is connected to the bearing cup 16. The first portion 21 of the retainer 20 is generally hollow and cylindrical in shape and extends generally co-axially relative to the trunnion 12 toward the body 11 of the cross 10. However, the first portion 21 of the retainer 20 may have any desired shape.

The first portion 21 of the retainer 20 has a flange 21a provided thereon. The flange 21a may have any desired shape. However, as shown in the embodiment illustrated in FIGS. 2 through 5, the flange 21a is preferably shaped having a well defined shoulder 21b. In the illustrated embodiment, the shoulder 21b extends generally radially inwardly toward the trunnion 12. The flange 21a cooperates with the groove 16a provided on the outer surface of the bearing cup 16 adjacent to the open end thereof. In the illustrated embodiment, both the flange 21a and the groove 16a extend continuously and circumferentially about the bearing cup 16. However, the flange 21a and the groove 16a may be formed having any desired shape and need not extend continuously and circumferentially about the bearing cup 16. As shown in FIG. 2, the groove 16a is somewhat larger in dimension than the flange 21a such that a clearance is normally provided therebetween. Such clearance is desirable because it allows the bearing cup 16 to rotate freely relative to the retainer 20 when installed, as described below.

The bearing cup retainer 20 also includes a second portion 22 that extends from the first portion 21. In the illustrated embodiment, the second portion 22 of the retainer 20 is shaped generally in the form of a hollow conical frustum. However, the second portion 22 of the retainer 20 may have any desired shape. An interior angle 22a is defined between the first portion 21 and the second portion 22 of the retainer 20. This interior angle 22a is preferably an obtuse angle, i.e., greater than ninety degrees but less than one hundred eighty degrees. For example, the interior angle 22a may be approximately one hundred twenty degrees. However, the interior angle 22a may be set at any desired angle.

The bearing cup retainer 20 further includes a third portion 23 that extends from the second portion 22. In the illustrated embodiment, the third portion 23 of the retainer 20 is also shaped generally in the form of a hollow conical frustum. However, the third portion 23 of the retainer 20 may have any desired shape. An interior angle 23a is defined between the second portion 22 and the third portion 23 of the retainer 20. This interior angle is preferably an acute angle, i.e., greater than zero degrees but less than ninety degrees. For example, the interior angle 23a may be approximately sixty degrees. However, the interior angle 23a may be set at any desired angle.

The third portion 23 of the retainer 20 extends into engagement with a portion of the trunnion 12. To accomplish this, the third portion 23 of the retainer 20 has a flange 23b provided thereon that extends inwardly into engagement with a portion of the trunnion 12. In the illustrated embodiment, the flange 23b extends continuously and circumferentially about the trunnion 12. However, the flange 23b need not extend continuously and circumferentially about the trunnion 12 if desired. The flange 23b may have any desired shape. However, as shown in the embodiment illustrated in FIGS. 2 through 5, the flange 23b preferably has a first edge 23b' that is defined by a relatively large radius of curvature and a second edge 23b" that is defined by a relatively small radius of curvature. Relative to the trunnion 12, the first edge 23b' is located axially inwardly from the second edge 23b". The purpose for the different shapes for the first edge 23b' and the second edge 23b" of the flange 23b will be explained below.

To assemble the bearing cup 16 onto the trunnion 12 of the cross 10, the thrust washer 18 and the roller bearings 17 are initially assembled within the bearing cup 16. The seal assembly 19 is then pressed into frictional engagement with the inner bearing surface of the bearing cup 16 to retain the thrust washer 18 and the roller bearings 17 therein. Next, the retainer 20 is installed on the bearing cup 16 by initially co-axially aligning the retainer 20 with the open end of the bearing cup 16, then moving the retainer 20 axially toward the bearing cup 16. As a result, the flange 21a of the first portion 21 of the retainer 20 initially flexes outwardly about the open end of the bearing cup 16, then snaps back inwardly such that it is received within the groove 16a provided on the bearing cup 16 in a snap fit relationship.

Figure 3:
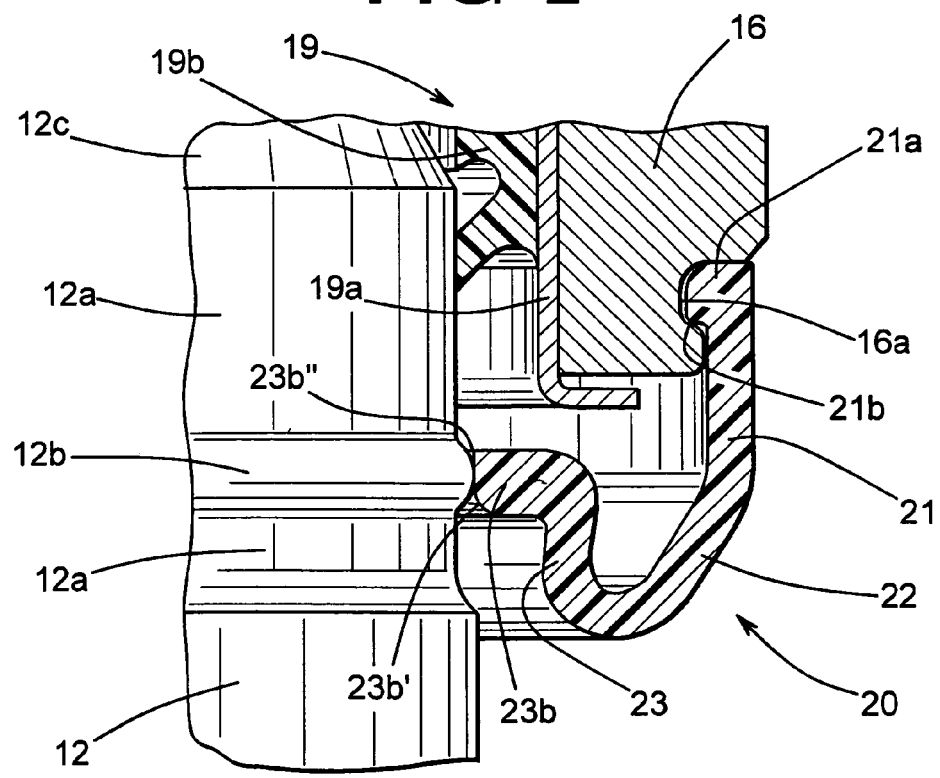
FIG. 3 is an enlarged elevational view similar to FIG. 2 showing the bearing cup and the retainer in an intermediate stage of installation on the trunnion.
Figure 4:
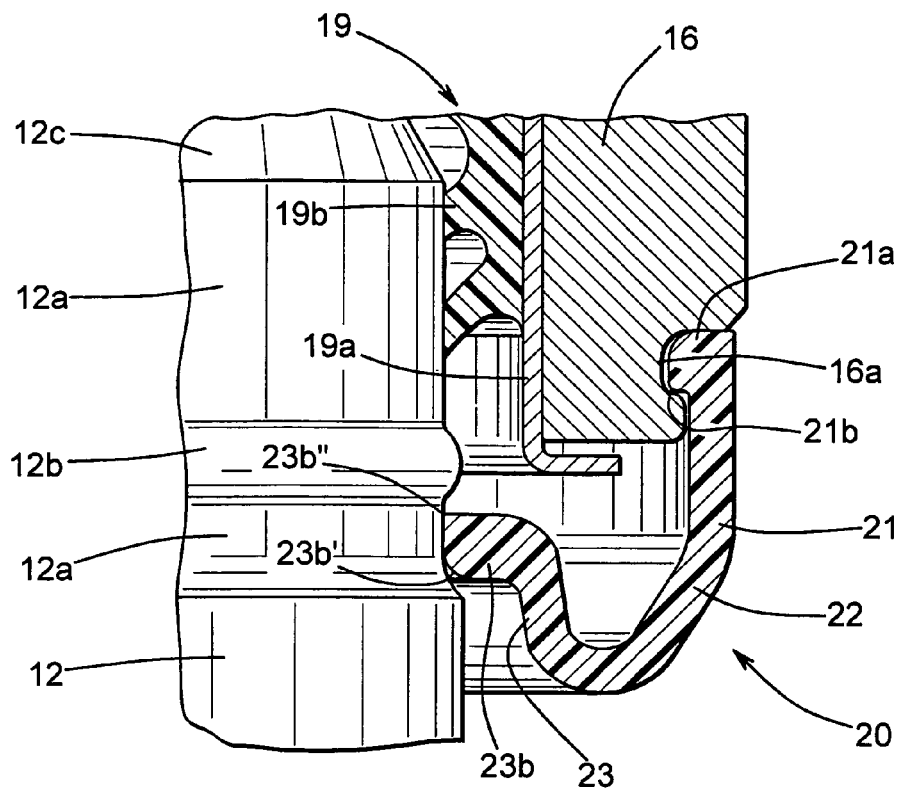
FIG. 4 is an enlarged elevational view similar to FIG. 3 showing the bearing cup and the retainer in a final stage of installation on the trunnion.

The installation of the assembly of the bearing cup 16 and the retainer 20 onto the trunnion 12 of the cross 10 is illustrated in FIGS. 2, 3, and 4. Initially, the assembly of the bearing cup 16 and the retainer 20 is co-axially aligned with the end surface 12e of the trunnion 12. The assembly of the bearing cup 16 and the retainer 20 is then moved axially toward and concentrically about the trunnion 12 such that the bearing cup 16 and the retainer 20 are received thereon, as shown in FIG. 2. During this initial stage of installation, the flange 23b of the third portion 23 of the retainer 20 frictionally engages and slides along the cylindrical friction surface 12a of the trunnion 12.

At an intermediate stage of installation, the flange 23b of the third portion 23 of the retainer 20 engages the ridge 12b provided on the trunnion 12, as shown in FIG. 3. Such engagement causes the flange 23b and the third portion 23 of the retainer 20 to be moved radially outwardly from their prior positions illustrated in FIG. 2 as they slide over the ridge 12b. This engagement and sliding action is facilitated by the first edge 23b' of the flange 23b which, as mentioned above, has the relatively large radius of curvature. The radially outwardly movement of the flange 23b and the third portion 23 of the retainer 20 is accommodated by flexing of the retainer 20. In particular, such flexing occurs primarily between the second portion 22 and the third portion 23 of the retainer 20, causing the magnitude of the interior angle 23a to decrease somewhat. Thereafter, in a final stage of installation shown in FIG. 4, the flange 23b of the third portion 23 of the retainer 20 moves radially outwardly as it slides past the ridge 12b and back onto the cylindrical friction surface 12a provided on the trunnion 12. It will be appreciated that a first predetermined amount of axial force is required to install the assembly of the bearing cup 16 and the retainer 20 on the trunnion 12 in this manner.

Figure 5:
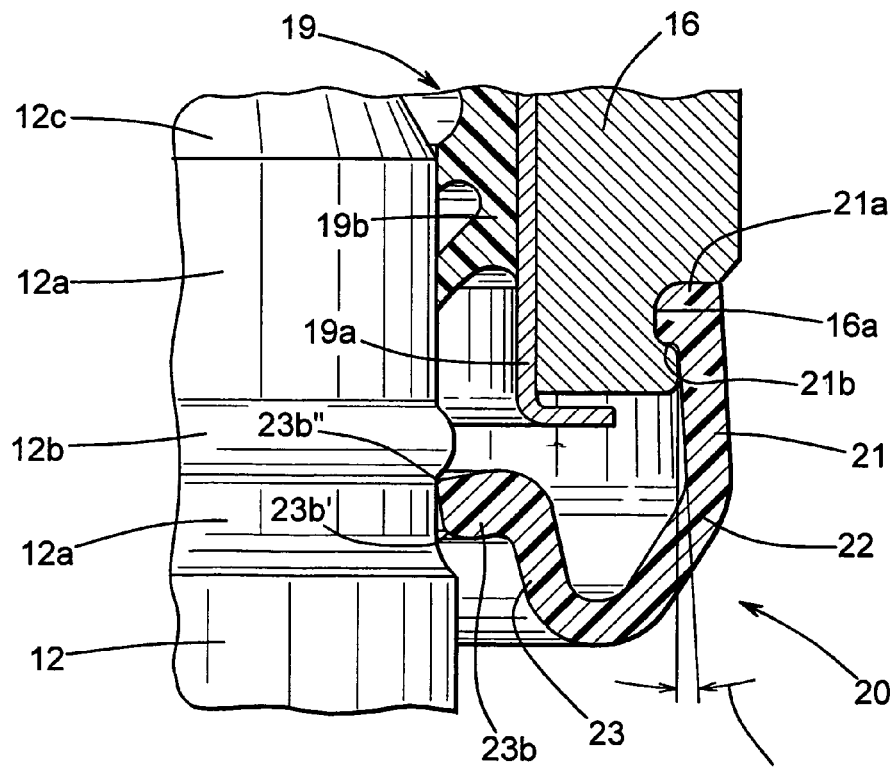
FIG. 5 is an enlarged elevational view similar to FIG. 4 showing the bearing cup and the retainer during an initial stage of removal from the trunnion.

FIG. 5 illustrates the assembly of the bearing cup 16 and the retainer 20 during an initial stage of removal from the trunnion 12. Normally, such removal does not occur because of the interference fit between the flange 23b of the retainer 20 and cylindrical friction surface 12a of the trunnion 12. The frictional engagement between the flange 23b of the retainer 20 and cylindrical friction surface 12a of the trunnion 12 is normally sufficient to prevent the assembly of the bearing cup 16 and the retainer 20 from being removed inadvertently from the trunnion 12. However, if such removal is attempted, the retainer 20 provides additional resistance thereto. As shown in FIG. 5, during such attempted removal, the second edge 23b" of the flange 23b initially engages the ridge 12b provided on the trunnion 12. As mentioned above, the second edge 23b" of the flange 23b has a small radius of curvature relative to the radius of curvature of the first edge 23b'. Unlike the first edge 23b' during the installation process described above, the engagement of the second edge 23b" of the flange 23b with the ridge 12b provided on the trunnion 12 does not facilitate the removal of the assembly of the bearing cup 16 and the retainer 20, but rather requires that an additional force be exerted.

As shown in FIG. 5, the engagement of the second edge 23b" of the flange 23b with the ridge 12b provided on the trunnion 12 causes the first portion 21 of the retainer 20 to pivot or flex outwardly from its original generally co-axial orientation, as indicated by the angle 25. At the same time, flexing occurs both between the first portion 21 and the second portion 22 of the retainer 20 (causing the magnitude of the interior angle 22a to increase somewhat) and between the second portion 22 and the third portion 23 of the retainer 20 (causing the magnitude of the interior angle 23a to increase somewhat). It will be appreciated that a second predetermined amount of force is required to remove the assembly of the bearing cup 16 and the retainer 20 on the trunnion 12 in this manner. This second predetermined amount of force is greater than the first predetermined amount of force required to install the assembly of the bearing cup 16 and the retainer 20 on the trunnion 12 discussed above. Accordingly, the retainer 20 allows the assembly of the bearing cup 16 and the retainer 20 to be installed on the trunnion 12 with a relatively small force, but requires a relatively large force to remove the assembly of the bearing cup 16 and the retainer 20 from the trunnion 12.

By retaining the bearing cup 16 on the trunnion 12 in this manner, there is generally no need for external straps or other devices to retain the bearing cup 16 on the trunnion 12 when shipping the cross 10 for subsequent installation. When there is a loose fit between the retainer 20 and the bearing cup 16 (provided by the clearance between the groove 16a of the bearing cup 16 and the flange 21a of the first portion 21a of the retainer 20), the bearing cup 16 is free to rotate relative to the retainer 20 without interference, even after installation.

Figure 6:
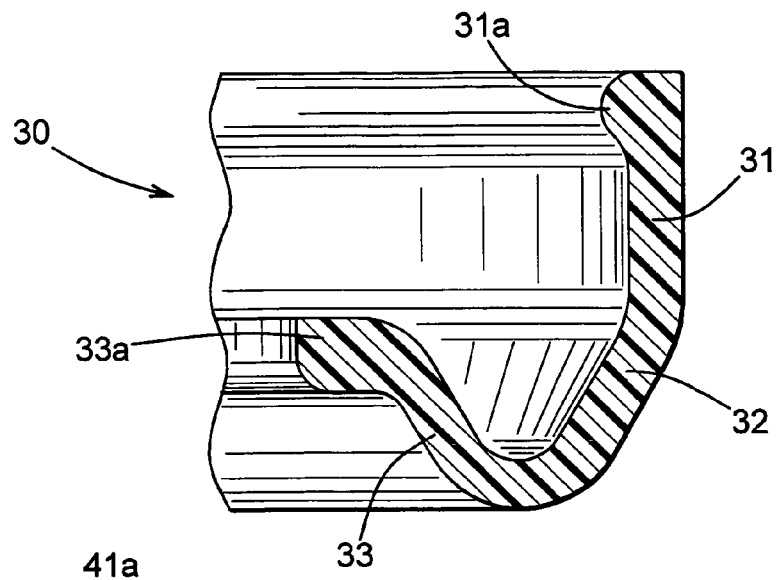
FIG. 6 is an enlarged sectional elevational view of a second embodiment of a retainer in accordance with this invention.

FIG. 6 illustrates a second embodiment of a retainer, indicated generally at 30, in accordance with this invention. The second embodiment of the retainer 30 is generally similar to the first embodiment 20 discussed above, including a first portion 31 having a flange 31a, a second portion 32, and a third portion 33 having a flange 33b. However, unlike the flange 21a that extended generally radially inwardly toward the trunnion 12, the flange 31a has a rounded surface that is defined by a generally constant radius. The structure and operation of the second embodiment of the retainer 30 is otherwise the same as described above.

Figure 7:
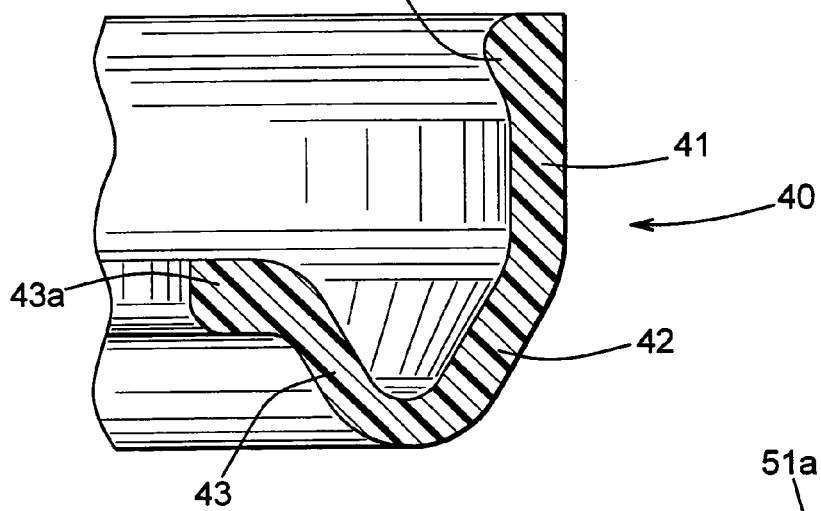
FIG. 7 is an enlarged sectional elevational view of a third embodiment of a retainer in accordance with this invention.

FIG. 7 illustrates a third embodiment of a retainer, indicated generally at 40, in accordance with this invention. The third embodiment of the retainer 40 is also generally similar to the first embodiment 20 discussed above, including a first portion 41 having a flange 41a, a second portion 42, and a third portion 43 having a flange 43b. However, unlike the flange 21a that extended generally radially inwardly toward the trunnion 12, the flange 41a has a rounded surface that is defined by a varying radius. The structure and operation of the third embodiment of the retainer 40 is otherwise the same as described above.

Figure 8:
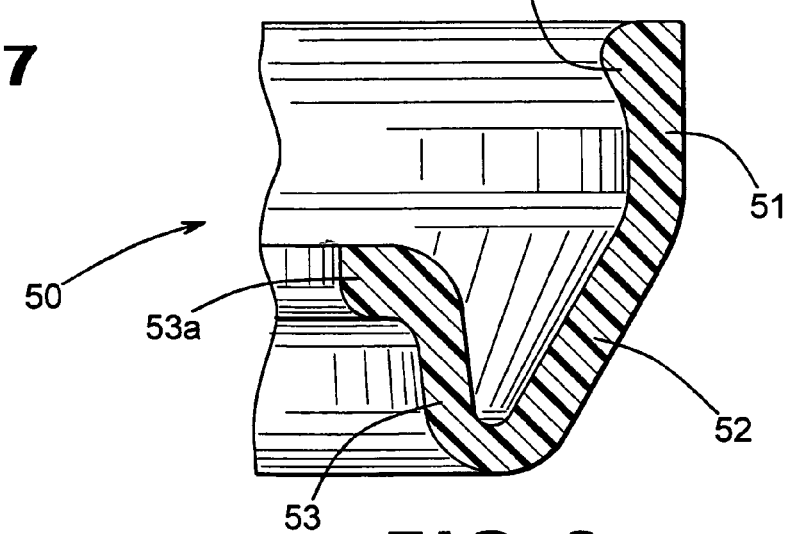
FIG. 8 is an enlarged sectional elevational view of a fourth embodiment of a retainer in accordance with this invention.

FIG. 8 illustrates a fourth embodiment of a retainer, indicated generally at 50, in accordance with this invention. The fourth embodiment of the retainer 50 is also generally similar to the first embodiment 20 discussed above, including a first portion 51 having a flange 51a, a second portion 52, and a third portion 53 having a flange 53b. However, unlike the third portion 23 that was shaped generally in the form of a hollow conical frustum, the third portion 53 is shaped generally in the form of a hollow cylinder. The structure and operation of the fourth embodiment of the retainer 40 is otherwise the same as described above.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A cross for a universal joint comprising:
   a body portion;
   a trunnion extending outwardly from said body portion, said trunnion including a surface;
   a bearing cup mounted on said trunnion; and
   a retainer for retaining said bearing cup on said trunnion, said retainer including a first portion that is supported on said bearing cup, a second portion that extends at an angle from said first portion, and a third portion that extends at an angle from said second portion into engagement with said surface of said trunnion, said retainer have a generally uniform thickness throughout said first, second, and third portions.

2. The cross defined in claim 1 wherein said second portion of said retainer extends at an obtuse angle relative to said first portion of said retainer.

3. The cross defined in claim 2 wherein said second portion of said retainer extends at an angle of approximately one hundred twenty degrees relative to said first portion of said retainer.

4. The cross defined in claim 1 wherein said third portion of said retainer extends at an acute angle relative to said second portion of said retainer.

5. The cross defined in claim 4 wherein said third portion of said retainer extends at an angle of approximately sixty degrees relative to said second portion of said retainer.

6. The cross defined in claim 1 wherein said second portion of said retainer extends at an obtuse angle relative to said first portion of said retainer, and wherein said third portion of said retainer extends at an acute angle relative to said second portion of said retainer.

7. The cross defined in claim 6 wherein said second portion of said retainer extends at an angle of approximately one hundred twenty degrees relative to said first portion of said retainer, and wherein said third portion of said retainer extends at an angle of approximately sixty degrees relative to said second portion of said retainer.

8. The cross defined in claim 1 wherein the bearing cup has a groove formed therein, and wherein said first portion of said retainer extends within said groove to support said retainer on said bearing cup.

9. The cross defined in claim 8 wherein said first portion of said retainer has a flange formed thereon that extends within said groove.

10. The cross defined in claim 9 wherein said flange has a shoulder that extends generally radially inwardly toward said trunnion.

11. The cross defined in claim 9 wherein said flange has a rounded surface that is defined by a generally constant radius.

12. The cross defined in claim 9 wherein said flange has a rounded surface that is defined by a varying radius.

13. The cross defined in claim 1 wherein said first portion is shaped generally in the form of a hollow cylinder, said second portion is shaped generally in the form of a hollow conical frustum, and said third portion is shaped generally in the form of a hollow conical frustum.

14. The cross defined in claim 1 wherein said first portion is shaped generally in the form of a hollow cylinder, said second portion is shaped generally in the form of a hollow conical frustum, and said third portion is shaped generally in the form of a hollow cylinder.

15. The cross defined in claim 1 wherein said surface of said trunnion has a ridge formed thereon, and wherein said third portion of said retainer extends into engagement with said surface of said trunnion between said body portion and said ridge.

* * * * *